US008448254B2

(12) United States Patent
Saito

(10) Patent No.: US 8,448,254 B2
(45) Date of Patent: *May 21, 2013

(54) DIGITAL CONTENT MANAGEMENT SYSTEM AND APPARATUS

(75) Inventor: Makoto Saito, Kaitori Tama (JP)

(73) Assignee: Intarsia Software LLC, Las Vegas, NV (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/917,184

(22) Filed: Nov. 1, 2010

(65) Prior Publication Data

US 2011/0047626 A1    Feb. 24, 2011

Related U.S. Application Data

(60) Continuation of application No. 10/013,507, filed on Dec. 13, 2001, now Pat. No. 7,827,109, which is a division of application No. 08/868,488, filed on Jun. 3, 1997, now Pat. No. 6,424,715, which is a continuation-in-part of application No. 08/573,958, filed on Dec. 13, 1995, now Pat. No. 5,740,246, and a continuation-in-part of application No. 08/549,270, filed on Oct. 27, 1995, now abandoned.

(30) Foreign Application Priority Data

Oct. 27, 1994  (JP) ........................... 6-264200
Dec. 2, 1994   (JP) ........................... 6-299835
Dec. 13, 1994  (JP) ........................... 6-309292

(51) Int. Cl.
*G06F 7/04* (2006.01)
(52) U.S. Cl.
USPC .......................................... 726/26

(58) Field of Classification Search
USPC ................... 726/26; 705/51–52, 59; 380/201
See application file for complete search history.

(56) References Cited

U.S. PATENT DOCUMENTS 4,104,721 A    8/1978   Markstein et al.
4,168,396 A    9/1979   Best
(Continued)

FOREIGN PATENT DOCUMENTS

DE    3717261    11/1987
EP    0121853    10/1984
(Continued)

OTHER PUBLICATIONS

Memon, Nasir, et al., "Protecting Digital Media Content," Association for Computing Machinery, Communications of the ACM, New York, Jul. 1998, vol. 41, issue 7, pp. 35-43.
(Continued)

*Primary Examiner* — Samson Lemma

(57) ABSTRACT

There are provided a digital content management apparatus which further embodies a digital content management apparatus used with a user terminal, and a system which protects the secrets of a digital content. The system and the apparatus are a real time operating system using a micro-kernel, which is incorporated in the digital content management apparatus as an interruption process having high priority. When a user uses the digital content, whether there is an illegitimate usage or not, is watched by interrupting the usage process. In the case where illegitimate usage is carried out, a warning is given or the usage is stopped. The decryption/re-encryption functions of the digital content management apparatus having the decryption/re-encryption functions are not restricted to the inside of the user apparatus. By providing the decryption/re-encryption functions between the networks, the exchange of secret information between different networks is secured. By using this apparatus for converting a crypt algorithm, information exchange is made possible between systems which adopt different algorithms.

20 Claims, 5 Drawing Sheets

U.S. PATENT DOCUMENTS

| | | | |
|---|---|---|---|
| 4,225,884 A | 9/1980 | Block et al. |
| 4,278,337 A | 7/1981 | Mashimo |
| 4,278,837 A | 7/1981 | Best |
| 4,352,952 A | 10/1982 | Boone et al. |
| 4,386,233 A | 5/1983 | Smid et al. |
| 4,408,203 A | 10/1983 | Campbell |
| 4,423,287 A | 12/1983 | Zeidler |
| 4,465,901 A | 8/1984 | Best |
| 4,466,063 A | 8/1984 | Segarra et al. |
| 4,500,750 A | 2/1985 | Elander et al. |
| 4,527,195 A | 7/1985 | Cheung |
| 4,536,647 A | 8/1985 | Atalla et al. |
| 4,558,176 A | 12/1985 | Arnold et al. |
| 4,567,512 A | 1/1986 | Abraham |
| 4,578,530 A | 3/1986 | Zeidler |
| 4,588,991 A | 5/1986 | Atalla |
| 4,613,901 A | 9/1986 | Gilhousen et al. |
| 4,623,918 A | 11/1986 | Chomet |
| 4,709,266 A | 11/1987 | Hanas et al. |
| 4,710,955 A | 12/1987 | Kauffman |
| 4,736,422 A | 4/1988 | Mason |
| 4,751,732 A | 6/1988 | Kamitake |
| 4,757,534 A | 7/1988 | Matyas et al. |
| 4,759,062 A | 7/1988 | Traub et al. |
| 4,791,565 A | 12/1988 | Dunham et al. |
| 4,796,220 A | 1/1989 | Wolfe |
| 4,799,156 A | 1/1989 | Shavit et al. |
| 4,817,140 A | 3/1989 | Chandra et al. |
| 4,827,508 A | 5/1989 | Shear |
| 4,829,569 A | 5/1989 | Seth-Smith et al. |
| 4,850,017 A | 7/1989 | Matyas, Jr. et al. |
| 4,852,154 A | 7/1989 | Lewis et al. |
| 4,862,268 A | 8/1989 | Campbell et al. |
| 4,864,494 A | 9/1989 | Kobus, Jr. |
| 4,864,614 A | 9/1989 | Crowther |
| 4,864,615 A | 9/1989 | Bennett et al. |
| 4,866,707 A | 9/1989 | Marshall et al. |
| 4,890,319 A | 12/1989 | Seth-Smith et al. |
| 4,890,321 A | 12/1989 | Seth-Smith et al. |
| 4,905,277 A | 2/1990 | Nakamura |
| RE33,189 E | 3/1990 | Lee et al. |
| 4,916,737 A | 4/1990 | Chomet et al. |
| 4,919,545 A | 4/1990 | Yu |
| 4,933,969 A | 6/1990 | Marshall et al. |
| 4,941,176 A | 7/1990 | Matyas et al. |
| 4,965,568 A | 10/1990 | Atalla et al. |
| 4,977,594 A | 12/1990 | Shear |
| 4,995,080 A | 2/1991 | Bestler et al. |
| 5,005,200 A | 4/1991 | Fischer |
| 5,007,082 A | 4/1991 | Cummins |
| 5,008,853 A | 4/1991 | Bly et al. |
| 5,008,936 A | 4/1991 | Hamilton et al. |
| 5,010,571 A | 4/1991 | Katznelson |
| 5,029,207 A | 7/1991 | Gammie |
| 5,034,980 A | 7/1991 | Kubota |
| 5,036,461 A | 7/1991 | Elliott et al. |
| 5,046,093 A | 9/1991 | Wachob |
| 5,054,064 A | 10/1991 | Walker et al. |
| 5,060,262 A | 10/1991 | Bevins, Jr. et al. |
| 5,077,665 A | 12/1991 | Silverman et al. |
| 5,083,309 A | 1/1992 | Beysson |
| 5,091,938 A | 2/1992 | Thompson et al. |
| 5,103,476 A | 4/1992 | Waite et al. |
| 5,113,518 A | 5/1992 | Durst, Jr. et al. |
| 5,124,117 A | 6/1992 | Tatebayashi et al. |
| 5,124,984 A | 6/1992 | Engel |
| 5,126,566 A | 6/1992 | Shimada |
| 5,138,659 A | 8/1992 | Kelkar et al. |
| 5,142,579 A | 8/1992 | Anderson |
| 5,144,663 A | 9/1992 | Kudelski et al. |
| 5,146,497 A | 9/1992 | Bright |
| 5,155,680 A | 10/1992 | Wiedemer |
| 5,157,726 A | 10/1992 | Merkle et al. |
| 5,163,096 A | 11/1992 | Clark et al. |
| 5,173,939 A | 12/1992 | Abadi et al. |
| 5,175,416 A | 12/1992 | Mansvelt et al. |
| 5,191,611 A | 3/1993 | Lang |
| 5,196,840 A | 3/1993 | Leith et al. |
| 5,200,999 A | 4/1993 | Matyas et al. |
| 5,201,000 A | 4/1993 | Matyas et al. |
| 5,204,961 A | 4/1993 | Barlow |
| 5,220,604 A | 6/1993 | Gasser et al. |
| 5,224,163 A | 6/1993 | Gasser et al. |
| 5,227,893 A | 7/1993 | Ett |
| 5,235,641 A | 8/1993 | Nozawa et al. |
| 5,247,575 A | 9/1993 | Sprague et al. |
| 5,253,294 A | 10/1993 | Maurer |
| 5,270,773 A | 12/1993 | Sklut et al. |
| 5,291,598 A | 3/1994 | Grundy |
| 5,293,422 A | 3/1994 | Loiacono |
| 5,301,245 A | 4/1994 | Endoh |
| 5,313,521 A | 5/1994 | Torii et al. |
| 5,315,657 A | 5/1994 | Abadi et al. |
| 5,319,705 A | 6/1994 | Halter et al. |
| 5,319,710 A | 6/1994 | Atalla et al. |
| 5,323,464 A | 6/1994 | Elander et al. |
| 5,341,425 A | 8/1994 | Wasilewski et al. |
| 5,343,527 A | 8/1994 | Moore |
| 5,345,508 A | 9/1994 | Lynn et al. |
| 5,347,581 A | 9/1994 | Naccache et al. |
| 5,349,662 A | 9/1994 | Johnson et al. |
| 5,353,351 A | 10/1994 | Bartoli et al. |
| 5,355,414 A | 10/1994 | Hale et al. |
| 5,361,091 A | 11/1994 | Hoarty et al. |
| 5,369,702 A | 11/1994 | Shanton |
| 5,371,794 A | 12/1994 | Diffie et al. |
| 5,375,240 A | 12/1994 | Grundy |
| 5,381,480 A | 1/1995 | Butter et al. |
| 5,388,211 A * | 2/1995 | Hornbuckle ................. 717/178 |
| 5,390,297 A | 2/1995 | Barber et al. |
| 5,392,351 A | 2/1995 | Hasebe et al. |
| 5,400,403 A | 3/1995 | Fahn et al. |
| 5,402,492 A | 3/1995 | Goodman et al. |
| 5,410,602 A | 4/1995 | Finkelstein et al. |
| 5,414,772 A | 5/1995 | Naccache et al. |
| 5,418,853 A | 5/1995 | Kanota et al. |
| 5,428,606 A | 6/1995 | Moskowitz |
| 5,428,685 A | 6/1995 | Kadooka et al. |
| 5,438,508 A | 8/1995 | Wyman |
| 5,442,541 A | 8/1995 | Hube et al. |
| 5,442,706 A | 8/1995 | Kung |
| 5,444,779 A | 8/1995 | Daniele |
| 5,444,782 A | 8/1995 | Adams, Jr. et al. |
| 5,450,493 A | 9/1995 | Maher |
| 5,453,601 A | 9/1995 | Rosen |
| 5,455,863 A | 10/1995 | Brown et al. |
| 5,455,941 A | 10/1995 | Okuno et al. |
| 5,457,746 A | 10/1995 | Dolphin |
| 5,465,299 A | 11/1995 | Matsumoto et al. |
| 5,469,571 A | 11/1995 | Bunnell |
| 5,473,691 A | 12/1995 | Menezes et al. |
| 5,475,757 A | 12/1995 | Kelly |
| 5,475,758 A | 12/1995 | Kikuchi |
| 5,479,514 A | 12/1995 | Klonowski |
| 5,483,598 A | 1/1996 | Kaufman et al. |
| 5,483,658 A | 1/1996 | Grube et al. |
| 5,485,577 A | 1/1996 | Eyer et al. |
| 5,490,216 A | 2/1996 | Richardson, III |
| 5,493,728 A | 2/1996 | Solton et al. |
| 5,495,533 A | 2/1996 | Linehan et al. |
| 5,497,420 A | 3/1996 | Garneau et al. |
| 5,497,479 A | 3/1996 | Hornbuckle |
| 5,499,298 A | 3/1996 | Narasimhalu et al. |
| 5,499,340 A | 3/1996 | Barritz |
| 5,504,816 A | 4/1996 | Hamilton et al. |
| 5,504,817 A | 4/1996 | Shamir |
| 5,504,818 A | 4/1996 | Okano |
| 5,504,933 A | 4/1996 | Saito |
| 5,509,073 A | 4/1996 | Monnin |
| 5,509,074 A | 4/1996 | Choudhury et al. |
| 5,511,121 A | 4/1996 | Yacobi |
| 5,513,260 A | 4/1996 | Ryan |
| 5,515,441 A | 5/1996 | Faucher |
| 5,515,538 A | 5/1996 | Kleiman |

| | | | |
|---|---|---|---|
| 5,517,014 A | 5/1996 | Iijima | |
| 5,530,752 A | 6/1996 | Rubin | |
| 5,532,920 A | 7/1996 | Hartrick et al. | |
| 5,535,383 A | 7/1996 | Gower | |
| 5,541,994 A | 7/1996 | Tomko et al. | |
| 5,553,143 A | 9/1996 | Ross et al. | |
| 5,553,145 A | 9/1996 | Micali | |
| 5,553,281 A | 9/1996 | Brown et al. | |
| 5,557,346 A | 9/1996 | Lipner et al. | |
| 5,574,787 A | 11/1996 | Ryan | |
| 5,577,121 A | 11/1996 | Davis et al. | |
| 5,579,223 A | 11/1996 | Raman | |
| 5,581,682 A | 12/1996 | Anderson et al. | |
| 5,584,023 A | 12/1996 | Hsu | |
| 5,586,301 A | 12/1996 | Fisherman et al. | |
| 5,604,800 A | 2/1997 | Johnson et al. | |
| 5,606,609 A | 2/1997 | Houser et al. | |
| 5,606,613 A | 2/1997 | Lee et al. | |
| 5,607,411 A | 3/1997 | Heironimus et al. | |
| 5,633,934 A | 5/1997 | Hember | |
| 5,636,277 A | 6/1997 | Nagahama | |
| 5,642,418 A | 6/1997 | Farris et al. | |
| 5,646,992 A | 7/1997 | Subler et al. | |
| 5,646,997 A | 7/1997 | Barton | |
| 5,646,999 A | 7/1997 | Saito | |
| 5,649,099 A | 7/1997 | Theimer et al. | |
| 5,651,064 A | 7/1997 | Newell | |
| 5,666,411 A | 9/1997 | McCarty | |
| 5,680,452 A | 10/1997 | Shanton | |
| 5,689,587 A | 11/1997 | Bender et al. | |
| 5,706,210 A | 1/1998 | Kumano et al. | |
| 5,715,393 A | 2/1998 | Naugle | |
| 5,719,938 A | 2/1998 | Haas et al. | |
| 5,737,416 A | 4/1998 | Cooper et al. | |
| 5,737,536 A | 4/1998 | Herrmann et al. | |
| 5,740,246 A | 4/1998 | Saito | |
| 5,745,572 A | 4/1998 | Press | |
| 5,765,152 A | 6/1998 | Erickson | |
| 5,765,176 A | 6/1998 | Bloomberg | |
| 5,771,383 A | 6/1998 | Magee et al. | |
| 5,794,115 A | 8/1998 | Saito | |
| 5,805,706 A | 9/1998 | Davis | |
| 5,812,762 A | 9/1998 | Kim | |
| 5,818,933 A | 10/1998 | Kambe et al. | |
| 5,825,892 A | 10/1998 | Braudaway et al. | |
| 5,832,083 A | 11/1998 | Iwayama et al. | |
| 5,835,601 A | 11/1998 | Shimbo et al. | |
| 5,835,765 A | 11/1998 | Matsumoto | |
| 5,841,865 A | 11/1998 | Sudia | |
| 5,841,886 A | 11/1998 | Rhoads | |
| 5,848,155 A | 12/1998 | Cox | |
| 5,848,158 A | 12/1998 | Saito et al. | |
| 5,864,683 A | 1/1999 | Boebert et al. | |
| 5,867,579 A * | 2/1999 | Saito | 705/57 |
| 5,872,849 A | 2/1999 | Sudia | |
| 5,889,868 A | 3/1999 | Moskowitz et al. | |
| 5,901,339 A | 5/1999 | Saito | |
| 5,910,987 A | 6/1999 | Ginter et al. | |
| 5,912,969 A | 6/1999 | Sasamoto et al. | |
| 5,933,497 A | 8/1999 | Beetcher et al. | |
| 5,968,175 A | 10/1999 | Morishita et al. | |
| 5,974,141 A | 10/1999 | Saito | |
| 5,982,891 A | 11/1999 | Ginter et al. | |
| 5,986,690 A | 11/1999 | Hendricks | |
| 6,002,772 A | 12/1999 | Saito | |
| 6,006,328 A | 12/1999 | Drake | |
| 6,009,177 A | 12/1999 | Sudia | |
| 6,026,430 A | 2/2000 | Butman et al. | |
| 6,044,367 A | 3/2000 | Wolff | |
| 6,069,952 A | 5/2000 | Saito et al. | |
| 6,076,077 A | 6/2000 | Saito | |
| 6,081,794 A | 6/2000 | Saito et al. | |
| 6,091,835 A | 7/2000 | Smithies et al. | |
| 6,097,816 A | 8/2000 | Momiki et al. | |
| 6,097,818 A | 8/2000 | Saito | |
| 6,128,605 A | 10/2000 | Saito et al. | |
| 6,160,891 A | 12/2000 | Al-Salqan | |
| 6,182,218 B1 | 1/2001 | Saito | |
| 6,209,092 B1 | 3/2001 | Linnartz | |

| | | |
|---|---|---|
| 6,226,618 B1 | 5/2001 | Downs et al. |
| 6,272,635 B1 | 8/2001 | Saito |
| 6,301,673 B1 | 10/2001 | Foster et al. |
| 6,319,125 B1 | 11/2001 | Acres |
| 6,408,390 B1 | 6/2002 | Saito |
| 6,415,271 B1 | 7/2002 | Turk et al. |
| 6,424,715 B1 | 7/2002 | Saito |
| 6,438,694 B2 | 8/2002 | Saito |
| 6,449,717 B1 | 9/2002 | Saito |
| 6,463,536 B2 | 10/2002 | Saito |
| 6,519,623 B1 | 2/2003 | Mancisidor |
| 6,560,339 B1 | 5/2003 | Iwamura |
| 6,574,609 B1 | 6/2003 | Downs et al. |
| 6,603,864 B1 | 8/2003 | Matsunoshita |
| 6,615,258 B1 | 9/2003 | Barry et al. |
| 6,668,324 B1 | 12/2003 | Mangold et al. |
| 6,721,887 B2 | 4/2004 | Saito |
| 6,741,991 B2 | 5/2004 | Saito |
| 6,744,894 B1 | 6/2004 | Saito |
| 6,789,197 B1 | 9/2004 | Saito |
| 6,851,053 B1 | 2/2005 | Liles et al. |
| 6,874,089 B2 | 3/2005 | Dick et al. |
| 6,912,284 B1 | 6/2005 | Palmatier |
| 7,024,681 B1 | 4/2006 | Fransman et al. |
| 7,036,019 B1 | 4/2006 | Saito |
| 7,093,295 B1 | 8/2006 | Saito |
| 7,302,415 B1 | 11/2007 | Saito |
| 7,337,323 B2 | 2/2008 | Cochran et al. |
| 7,363,434 B2 | 4/2008 | Polyudov |
| 7,447,914 B1 | 11/2008 | Saito |
| 7,461,249 B1 | 12/2008 | Pearson et al. |
| 7,484,095 B2 | 1/2009 | de Jong |
| 7,500,093 B2 | 3/2009 | Makita |
| 7,711,152 B1 | 5/2010 | Davida et al. |
| 7,730,323 B2 | 6/2010 | Saito |
| RE41,657 E | 9/2010 | Saito |
| 2002/0021807 A1 | 2/2002 | Saito |
| 2002/0052850 A1 | 5/2002 | Saito |
| 2002/0112173 A1 | 8/2002 | Saito |
| 2003/0135464 A1 | 7/2003 | Mourad et al. |
| 2003/0144963 A1 | 7/2003 | Saito |
| 2005/0005134 A1 | 1/2005 | Herrod et al. |
| 2005/0262023 A1 | 11/2005 | Saito |
| 2006/0053077 A1 | 3/2006 | Mourad et al. |
| 2006/0282674 A1 | 12/2006 | Saito |
| 2006/0288426 A1 | 12/2006 | Saito |
| 2007/0033143 A1 | 2/2007 | Saito |
| 2007/0061267 A1 | 3/2007 | Saito |
| 2007/0079145 A1 | 4/2007 | Saito |
| 2007/0088960 A1 | 4/2007 | Saito |
| 2007/0174631 A1 | 7/2007 | Herrod et al. |
| 2010/0106659 A1 | 4/2010 | Stefik et al. |
| 2010/0122088 A1 | 5/2010 | Oxford |

FOREIGN PATENT DOCUMENTS

| | | |
|---|---|---|
| EP | 158167 | 10/1985 |
| EP | 0199410 | 10/1986 |
| EP | 0225010 | 6/1987 |
| EP | 0341801 | 11/1989 |
| EP | 0391261 | 10/1990 |
| EP | 0459046 | 12/1991 |
| EP | 0518365 | 12/1992 |
| EP | 0191162 | 2/1993 |
| EP | 0532381 | 3/1993 |
| EP | 0542298 | 5/1993 |
| EP | 0551016 | 7/1993 |
| EP | 561685 | 9/1993 |
| EP | 0561685 | 9/1993 |
| EP | 590763 | 4/1994 |
| EP | 0590763 | 4/1994 |
| EP | 0421808 | 12/1994 |
| EP | 0649074 | 4/1995 |
| EP | 0665486 | 8/1995 |
| EP | 0430734 | 9/1995 |
| EP | 0 677 949 | 10/1995 |
| EP | 0354774 | 4/1996 |
| EP | 0 715 241 | 6/1996 |
| EP | 0715243 | 6/1996 |
| EP | 0450841 | 8/1996 |

| | | |
|---|---|---|
| EP | 0506435 | 10/1996 |
| EP | 0489385 | 3/1997 |
| EP | 0438154 | 7/1997 |
| EP | 0398645 | 8/1997 |
| EP | 0813133 | 12/1997 |
| EP | 0677949 | 5/2003 |
| EP | 0719045 | 10/2003 |
| EP | 0704785 | 11/2003 |
| EP | 0715241 | 1/2004 |
| EP | 0746126 | 12/2004 |
| EP | 0581227 | 9/2005 |
| EP | 0709760 | 5/2006 |
| EP | 0709760 | 6/2006 |
| GB | 2231244 | 11/1990 |
| JP | 58169000 | 10/1983 |
| JP | 59169000 | 9/1984 |
| JP | 60-102038 | 6/1985 |
| JP | 2546983 | 5/1986 |
| JP | 62-169540 | 7/1987 |
| JP | 64-041387 | 2/1989 |
| JP | 01048165 | 2/1989 |
| JP | 64-061782 | 3/1989 |
| JP | 03-128541 | 5/1991 |
| JP | 03-162152 | 7/1991 |
| JP | 03-265241 | 11/1991 |
| JP | 03-282989 | 12/1991 |
| JP | 04-003224 | 1/1992 |
| JP | 04-181282 | 6/1992 |
| JP | 04-268844 | 9/1992 |
| JP | 05-056037 | 3/1993 |
| JP | 05-063142 | 3/1993 |
| JP | 05-075597 | 3/1993 |
| JP | 05-122701 | 5/1993 |
| JP | 05-276476 | 10/1993 |
| JP | 05-298373 | 11/1993 |
| JP | 05-316102 | 11/1993 |
| JP | 05-324936 | 12/1993 |
| JP | 05-327693 | 12/1993 |
| JP | 05-334324 | 12/1993 |
| JP | 6037750 | 2/1994 |
| JP | 06-095591 | 4/1994 |
| JP | 06-131806 | 5/1994 |
| JP | 06-152587 | 5/1994 |
| JP | 06-231536 | 8/1994 |
| JP | 06-236147 | 8/1994 |
| JP | 06-242304 | 9/1994 |
| JP | 06-264199 | 9/1994 |
| JP | 06-264201 | 9/1994 |
| JP | 06-269959 | 9/1994 |
| JP | 06-290087 | 10/1994 |
| JP | 06-318036 | 11/1994 |
| JP | 07-014045 | 1/1995 |
| JP | 7-271865 | 10/1995 |
| JP | 7302244 | 11/1995 |
| JP | 08-287014 | 1/1996 |
| JP | 08-185448 | 7/1996 |
| JP | 25-46983 | 8/1996 |
| JP | 08-272745 | 10/1996 |
| JP | 8292976 | 11/1996 |
| WO | 85/03830 | 8/1985 |
| WO | 89/09528 | 10/1989 |
| WO | 90/02382 | 3/1990 |
| WO | 9211598 | 7/1992 |
| WO | 93/07715 | 4/1993 |
| WO | 95/20291 | 7/1995 |
| WO | 96/13113 | 5/1996 |
| WO | 96/18152 | 6/1996 |
| WO | 96/23257 | 8/1996 |
| WO | 96/27259 | 9/1996 |
| WO | 9750036 | 12/1997 |

OTHER PUBLICATIONS

Murphy, Kathleen, "Digimarc Awarded Patent for Digital Watermarking," Business, Mar. 10, 1998, www.internetnews.com/bus-news/article.php/19611, 2 pages.
Hedberg, S.R. "HP's International Cryptography Framework: Compromise or Threat?" IEEE Computer, Jan. 1997, pp. 28-30.
Zhang, N. X., "Secure Code Distribution," IEEE Computer, Jun. 1997, pp. 76-79.
Anonymous, "Security," Government Executive, National Journal, Inc. Washington, vol. 29, issue 1, Jan. 1997, pp. 35-37.
Wayner, "Digital Copyright Protection," AP Professional, 1997, 16 pages.
Menezes, Alfred, et al., "Handbook of Applied Cryptography," 1997, sec.11.5.1, CRC Press, pp. 452-454.
Medvinsky, Gennady et al., "NetCash: A design for practical electronic currency on the Internet," University of Southern California Information Science Institute, Nov. 1993, pp. 2-7.
Fitch, K. "User Authentication and Software Distribution on the Web," AusWeb96-Technical Futures-Software Distribution and User Authentication on the Web, Nov. 5, 1996, pp. 1-12.
Rubin, A.D., "Trusted Distribution of Software Over the Internet," Network and Distributed System Security, Feb. 16-17, 1995, San Diego, California, pp. 47-53.
Bryan, John "A look at five different firewall products and services you can install today," www.byte.com/art/9504/sec10/art6.htm, Apr. 1995.
Rubin, A.D., "Secure Distribution of Electronic Documents in an Hostile Environment," Computer Communications, vol. 18, No. 6, Jun. 1995, pp. 429-434.
Bellovin, S.M. et al., "Network Firewalls" IEEE Communications Magazine, Sep. 1994, pp. 50-57.
Rozenblit, M., "Secure Software Distribution," IEEE Network Operations and Management Symposium, vol. 2, Feb. 14-18, 1994, pp. 486-496.
Van Schyndel, R.G., et al., "A Digital Watermark" IEEE, Australia, 1994, pp. 86-90.
Lennil, P. "The IBM Microkernel Technology," OS/2 Developer, vol. 5, Nov. 1, 1993 (pp. 70-72, 74) XP000672962.
Seki, Kazunori et al., "A Proposal of a New Distribution Scheme for Software Products", Keio Department of Instrumentation Engineering, Faculty of Science and Technology, Keio University, Research report made at the information Processing Association, Japan, Jul. 20, 1993, vol. 93, No. 64, pp. 19-28.
Vigarie, J. "A device for real-time modification of access conditions in a D2-MAC/Packet EUROCRYPT signal: The Transcontroller," 18th International Television Symposium and Technical Exhibition, Montreux, Switzerland, Jun. 10-15, 1993, pp. 761-768.
Neuman, Clifford B., "Proxy-Based Authorization and Accounting for Distributed Systems," Proceedings of the 13th International Conference on Distributed Computing Systems, May 1993, pp. 283-291.
Harn Lein, et al., "A Software Authentication System for Information Integrity" Computers & Security International Journal Devoted to the Study of Technical and Financial Aspects of Computer Security, vol. II, Dec. 1, 1992, pp. 747-752, XP000332279.
Anonymous, "Encryption of Information to be Recorded so as to Prevent Unauthorized Playback," Research Disclosure No. 335, Mar. 1992, Emsworth, GB, p. 219.
F. Masuoka, "Progressing Flash Memories," Kogyo Chosakai Co., 1992, pp. 34-68 (English translation of underlined portions only).
Tatsuaki Okamoto, "Universal Electronic Cash", Technical Report of Institute of Electronics, Information and Communication Engineers (IEICE) Jul. 15, 1991, vol. 91, No. 127, pp. 39-47.
Komatsu N, et al: "A Proposal on Digital Watermark in Document Image Communication and its Application to Realizing a Signature," Electronics & Communications in Japan Part I, vol. 73, No. 5, Part I, May 1990, pp. 22-33.
Matsumoto, Tsutomu et al., "Cryptographic Key Sharing" Technical Report of Institute of Electronics, Information and Communication Engineers (IEICE), Mar. 27, 1990, vol. 89, No. 482, pp. 33-47.
Morizaki, H., "Introduction to Electronic Devices," Gijustsu Hyoron Publishing Co., 1989, pp. 260-266.
Gale, B. and Baylin, F., "Scrambling and Descrambling, Satellite and Cable TV," 2nd Ed, Baylin/Gale Productions 1986 Boulder CO; pp. 163-165.
Grampp, F.T. et al., "Unix Operating System Security," AT&T Bell Laboratories Technical Journal, vol. 63, No. 8, Oct. 1984, New York, pp. 1649-1672.
R. Adachi, "Introduction to Handcraft of Personal Computer," Natsume Publishing Co., pp. 141-155 (1983) (English translation of underlined portions only).
U.S. FIPS Publication 81 DES Modes of Operation, Dec. 2, 1980.

Tirkel, A.Z. et al., "Electronic Water Mark", Conference Proceedings Dicta, Dec. 1993, pp. 666-673.

Kent, Stephen T., "Internet Privacy Enhanced Mail", Association for Computing Machinery, Communications of the ACM, Aug. 1993, vol. 36, issue 9, pp. 48-61.

Ohtaki, Yasuhiro et al., "Cryptographic Management for Superdistribution" Technical Research Report of Electronic Information Communication Association, Mar. 8, 1991, vol. 90, No. 460, pp. 33-42.

RSA Laboratories, "2.1.3 What are the advantages and disadvantages of public-key cryptography compared with secret-key cryptography?", http://www.rsa.com/rsalabs/node.asp?id=2167#, third paragraph.

X5 Networks, "What are the Advantages and Disadvantages of Public-Key Cryptography Compared with Secret-Key Cryptography?", http://x5.net/faqs/crypto/q4.html, third paragraph.

Search Report dated Oct. 24, 2002.

Notice of Rejection mailed Oct. 15, 2002 from the Japanese Patent Office in Application No. 7-228366.

Notice of Rejection Japanese Patent Application No. 7-228366, mailed Jul. 15, 2003.

Notice of Final Decision of Rejection, Japan Patent Application No. 7-228366, dated Nov. 11, 2003.

European Search Report for European Application No. 95115068 dated Jun. 30, 1999, 2 pages.

Official Action in Japanese Application No. 2002-364160 dated Jun. 15, 2009, 4 pages. English Translation Available, 5 pages.

Notification of Inquiry in Japanese Application No. 2002-364160 dated Nov. 18, 2008, 3 pages. English Translation Available, 3 pages.

Official Action in Japanese Application No. 2002-364160 dated Dec. 21, 2009, 4 pages. English Translation Available.

Official Action in U.S. Appl. No. 10/352,078 issued Mar. 19, 2010, 18 pages.

Official Action in U.S. Appl. No. 10/352,078 issued Oct. 18, 2010, 16 pages.

Official Action in U.S. Appl. No. 11/496,777 issued Aug. 24, 2010, 15 pages.

Official Action in Japanese Application No. 2006-198703 dated Jan. 4, 2010, 7 pages. English Translation Available, 6 pages.

Official Action in Japanese Application No. 2006-198703 dated Jun. 4, 2010, 2 pages. English Translation Available, 3 pages.

Official Action in U.S. Appl. No. 11/469,035 issued Mar. 10, 2010, 7 pages.

Official Action in U.S. Appl. No. 11/469,035 issued Sep. 7, 2010, 8 pages.

Official Action in U.S. Appl. No. 11/469,035 issued Jul. 23, 2009, 6 pages.

Official Action in U.S. Appl. No. 11/469,035 issued Dec. 12, 2008, 7 pages.

Official Action in U.S. Appl. No. 11/469,035 issued Jun. 11, 2008, 7 pages.

Intention to Grant issued in European Application No. 06014712.1 on Dec. 17, 2008, 38 pages.

Official Action in European Application No. 06014713.9 issued Oct. 21, 2010, 6 pages.

Office Action for Japanese Patent Application No. 7-280984, issued Jan. 20, 2004. English Translation Available.

Decision of Board of Appeals of Japanese Patent Office (Appeal No. 2004-10462, Patent Application 7-280984), 4 pages.

Interference Initial Memorandum in U.S. Appl. No. 09/097,877, 1 page.

Official Action in U.S. Appl. No. 10/105,262 issued Aug. 4, 2008, 16 pages.

Official Action in U.S. Appl. No. 10/105,262 issued Jan. 31, 2008, 10 pages.

Advisory Action in U.S. Appl. No. 10/105,262 issued Oct. 21, 2008, 2 pages.

Appeal Brief in U.S. Appl. No. 10/105,262 issued Apr. 6, 2009, 58 pages.

Examiner's Answer to Appeal Brief in U.S. Appl. No. 10/105,262 issued Aug. 20, 2009, 21 pages.

Reply Brief in U.S. Appl. No. 10/105,262 issued Oct. 20, 2009, 16 pages.

Official Action in Japanese Application No. 2004-149423 dated Oct. 30, 2007, 2 pages. English Translation Available, 2 pages.

Official Action in U.S. Appl. No. 11/512,695 issued Apr. 16, 2010, 18 pages.

Official Action in U.S. Appl. No. 11/512,695 issued Nov. 18, 2010, 30 pages.

Official Action in U.S. Appl. No. 11/512,695 issued Oct. 15, 2009, 6 pages.

European Search Report for European Application No. 95116615.6 dated Dec. 1, 1998, 2 pages.

Official Action in U.S. Appl. No. 11/512,885 issued Dec. 4, 2009, 7 pages.

Official Action in U.S. Appl. No. 11/512,885 issued Jun. 9, 2010, 20 pages.

Official Action in U.S. Appl. No. 11/512,885 issued Oct. 13, 2010, 2 pages.

Official Action in U.S. Appl. No. 11/441,973 issued Dec. 30, 2009, 12 pages.

Official Action in U.S. Appl. No. 11/441,973 issued Jun. 25, 2010, 18 pages.

Official Action in Japanese Application No. 2007-260256 issued Oct. 13, 2010, 3 pages. English Summary Available.

Official Action in Japanese Patent Application No. 2007-260256 issued Sep. 7, 2009, 8 pages; English Translation Available.

Official Action in Japanese Application No. 2007-260256 dated Jan. 6, 2009, 3 pages. English Translation Available, 3 pages.

Search Report and Opinion issued in European Application No. 07001022.8 dated Mar. 25, 2009; 8 pages.

Office Action in U.S. Appl. No. 13/179,723 issued Dec. 7, 2012, 5 pages.

Office Action in U.S. Appl. No. 11/441,973 issued Oct. 12, 2012, 20 pages.

* cited by examiner

DIGITAL CONTENT MANAGEMENT SYSTEM AND APPARATUS

CROSS-REFERENCE TO RELATED APPLICATIONS

This application is a continuation of U.S. application Ser. No. 10/013,507 filed Dec. 13, 2001 now U.S. Pat. No. 7,827,109), which is a divisional of prior application Ser. No. 08/868,488, filed Jun. 3, 1997 (now U.S. Pat. No. 6,424,715), which is a continuation-in-part of prior applications Ser. No. 08/549,270 filed on Oct. 27, 1995 (now abandoned) and prior application Ser. No. 08/573,958, filed on Dec. 13, 1995 (now U.S. Pat. No. 5,740,246), which in turn claim the benefit of priority of Japanese Appl. Nos. 6-264200 filed Oct. 27, 1994, 6-299835 filed Dec. 2, 1994, and 06-309292 filed Dec. 13, 1994. The disclosures of each of the above-referenced applications are incorporated by reference herein in their entireties.

BACKGROUND OF THE INVENTION

1. Field of the Invention

The present invention relates to a system for managing digital content, specifically for managing a copyright of digital content claiming the copyright and for securing secrecy of digital content, and also relates to an apparatus implementing the system.

2. Background Art

In information-oriented society of today, a database system has been spread in which various data values having been stored independently in each computer so far are mutually used by computers connected by communication lines.

The information handled by the prior art database system is classical type coded information which can be processed by a computer and has a small amount of information or monochrome binary data like facsimile data at most. Therefore, the prior art database system has not been able to handle data with an extremely large amount of information such as a natural picture and a motion picture.

However, while the digital processing technique for various electric signals develops, development of the digital processing art has shown progress for a picture signal other than binary data having been handled only as an analog signal.

By digitizing the above picture signal, a picture signal such as a television signal can be handled by a computer. Therefore, a "multimedia system" for handling various data handled by a computer and picture data obtained by digitizing a picture signal at the same time is recognized as a future technique.

Because hitherto widely-spread analog content is deteriorated in quality whenever storing, copying, editing, or transmitting it, copyright issues associated with the above operations has not been a large problem. However, because digital content is not deteriorated in quality after repeatedly storing, copying, editing, or transmitting it, the control of copyrights associated with the above operations is a large problem.

Because there is not hitherto any exact method for handling a copyright for digital content, the copyright is handled by the copyright law or relevant contracts. Even in the copyright law, compensation money for a digital-type sound- or picture-recorder is only systematized.

Use of a database includes not only referring to the contents of the database but also normally effectively using the database by storing, copying, or editing obtained digital content. Moreover, it is possible to transmit edited digital content to another person via on-line by a communication line or via off-line by a proper recording medium. Furthermore, it is possible to transmit the edited digital content to the database to enter it as new digital content.

In an existing database system, only character data is handled. In a multimedia system, however, audio data and picture data which are originally analog content are digitized to a digital content and formed into a database in addition to the data such as characters which have been formed into a database so far.

Under the above situation, how to handle a copyright of digital content formed into a database is a large problem. However, there has not been adequate copyright management means for solving the problem so far, particularly copyright management means completed for secondary utilization of the digital content such as copying, editing, or transmitting of the digital content.

Although digital content referred to as "software with advertisement" or as freeware is, generally, available free of fee, it is copyrighted and its use may be restricted by the copyright depending on the way of use.

In view of the above, the inventor of the present invention has made various proposals thus far in order to protect a copyright of the digital content. In GB 2269302 and U.S. Pat. No. 5,504,933, the inventor has proposed a system for executing copyright management by obtaining a permit key from a key management center through a public telephone line, and has also proposed an apparatus for that purpose in GB 2272822. Furthermore, in EP 677949 and in EP 704785, a system has been proposed for managing the copyright of the digital content.

In these systems and apparatus, those who wish to view encrypted programs request to view a program using a communication device to a management center via a communication line, and the management center transmits a permit key in response to the request for viewing, and charges and collects a fee.

Upon receipt of the permit key, those who wish to view the program send the permit key to a receiver either by an on-line or an off-line means and the receiver, which as received the permit key, decrypts the encrypted program according to the permit key.

The system described in EP 677949 uses a program and copyright information to manage a copyright in addition to a key for permitting usage in order to execute the management of a copyright in displaying (including process to sound), storing, copying, editing, and transmitting of the digital content in a database system, including the real time transmission of digital picture content. The digital content management program for managing the copyright watches and manages to prevent from using the digital content outside the conditions of the user's request or permission.

Furthermore, EP 677949 discloses that the digital content is supplied from a database in an encrypted state, and is decrypted only when displayed and edited by the digital content management program, while the digital content is encrypted again when stored, copied or transmitted. EP 677949 also describes that the digital content management program itself is encrypted and is decrypted by the permit key, and that the decrypted digital content management program performs decryption and encryption of the digital content, and when usage other than storing and displaying of the digital content is executed, the copyright information is stored as a history, in addition to the original copyright information.

In U.S. patent application Ser. No. 08/549,270 and EP 0715241 relating to the present application, there is proposed a decryption/re-encryption apparatus having configuration of a board, PCMCIA card or an IC card for managing the copyright, and a system for depositing a crypt key. Also, a reference is made to apply the copyright management method to a video conference system and an electronic commerce system.

In U.S. patent application Ser. No. 08/549,271 and EP 709760, a system has been proposed wherein the protection of an original digital content copyright and an edited digital content copyright in case of the edited digital content using a plurality of digital contents is carried out by confirming the validity of a usage request according to a digital signature on an edit program by combining a secret-key cryptosystem and a public-key cryptosystem.

In U.S. patent application Ser. No. 08/573,958 and EP 719045, various forms have been proposed for applying the digital content management system to a database and a video-on-demand (VOD) systems or an electronic commerce.

In U.S. patent application Ser. No. 08/663,463, EP 746126, a system has been proposed, in which copyrights on an original digital content and a new digital content are protected by using a third crypt key and a copyright label in case of using and editing a plurality of digital contents.

As can be understood from the digital content management systems and the digital content management apparatus which have been proposed by the inventor of the present invention described above, the management of a digital content copyright can be realized by restricting encryption/decryption/re-encryption and the form of the usage. The cryptography technology and the usage restriction thereof can be realized by using a computer.

In order to use the computer efficiently, an operating system (OS) is used which, supervises the overall operation of the computer. The conventional operating system (OS) used on a personal computer or the like is constituted of a kernel for handling basic services such as memory control, task control, interruption, and communication between processes and OS services for handling other services.

However, improvement in the functions of the OS which supervises the overall operation of computers is now being demanded where circumstances change on the computer side, such as improved capability of microprocessors, a decreased price of RAMs (Random Access Memory) used as a main memory, as well as improvement in the performance capability of computers is required by users, as a consequence, the scale of an OS has become comparatively larger than before.

Since such an enlarged OS occupies a large space itself in the hard disk stored OS, the space for storing the application programs or data needed by the user is liable to be insufficient, with the result in which the usage convenience in the computer becomes unfavorable.

In order to cope with such a situation, in the latest OS, an environmental sub-system for performing emulation of other OS and graphics displaying, and a core sub-system such as a security sub-system are removed from the kernel, as a sub-system that is a part that depends on the user. The basic parts such as a HAL (hardware abstraction layer) for absorbing differences in hardware, a scheduling function, an interruption function, and an I/O control function is a micro-kernel, and a system service API (Application Programming Interface) is interposed between the sub-system and the micro-kernel, thereby constituting the OS.

By doing so, extension of the OS by change or addition of functions will be improved, and portability of the OS can be facilitated corresponding to the applications. By a distributed arrangement for elements of the micro-kernel to a plurality of network computers, the distributed OS can also be realized without difficulty.

Computers are used in computer peripheral units, various control units, and communication devices in addition to the personal computers represented by the desktop type or notebook type computers. In such a case, as an OS unique for embedding, applicable to each of the devices, a real time OS is adopted in which execution speed is emphasized, unlike in a general-purpose personal computer OS, in which the man-machine interface is emphasized.

Naturally, the development cost for a respective OS unique to each device embedded will be high. There has recently been proposed, therefore, that a general-purpose OS for personal computers as a real-time OS for embedding is used instead. By arranging a specified program for embedding in a sub-system combined with the micro-kernel, a real-time OS for embedding can be obtained for embedding.

As the major functions of an OS, there is a task control, such as scheduling, interruption processing, and the like. With respect to task control, there are two kinds of OS's; the single-task type, in which only one task is executed at the same time, and the multi-task type, in which a plurality of task processes are executed at the same time. The multi-task type is further classified into two kinds; one multi-task type, changing of tasks depends on the task to be executed, and the other multi-task type, the changing does not depend on the task to be executed.

In the aforementioned single-task type, the single-task type assigns one process to a CPU (Central Processing Unit) and the CPU is not released until the process comes to an end, and a non-preemptive multi-task type performs time-division for the CPU, and the CPU can be assigned to a plurality of processes. As long as the process which is being executed does not give control back to the OS, other processes are not executed. And a preemptive multi-task type interrupts the process which is being executed during a certain time interval and thereby forcibly move the control to another process. Consequently, real time multi-task can be available only in the case of the preemptive type.

Task control in a computer is performed according to processes being units having system resources such as a memory and a file. Process control is performed according to a thread, being a unit in which CPU time is assigned, in which the process is minutely divided. Incidentally, in this case, the system resources are shared in all the threads in the same process. More than one threads, therefore, may exist which share the system resources in one process.

Each task which is processed by the multi-task type has a priority spectrum, which is generally divided into 32 classes. In such a case, a normal task without interruption is classified into dynamic classes which are divided into 0 to 15 classes, while a task performing interruption is classified into real-time classes divided into 16 to 31 classes.

Interruption processing is carried out using interruption enabling time (generally, 10 milliseconds) referred to as a time slice, as one unit. A normal interruption is carried out during a time slice of 10 milliseconds. In such a situation, a time slice has recently been proposed wherein the interruption enabling time is set to 100 microseconds. When such a real time slice is used, an interruption can be carried out with greater priority than the conventional 10 milliseconds.

SUMMARY OF THE INVENTION

In the present application, there is proposed a digital content management apparatus which further embodies a digital content management apparatus which can be used with the user terminal proposed in EP 704785, for managing a digital content, specifically, a copyright of the digital content claiming the copyright. And also there is proposed a system to which the idea applied to the digital content management apparatus is further applied to secrecy protection of the digital content.

In the present application, a system for watching the illegitimate usage of the digital content and an apparatus therefor are proposed. These system and apparatus are a real time operating system using a micro-kernel, and are incorporated in the digital content management apparatus as an interruption process having a high priority, or are arranged in a network system using the digital content. It is watched whether an illegitimate usage or not, by interrupting into the use process when a user utilizes the digital content. In the case where illegitimate usage is performed, a warning or a stop for the usage is given.

Furthermore, in the present application, decryption/re-encryption functions in the digital content management apparatus having the decryption/re-encryption functions are not restricted within the user apparatus but are provided in a gateway or a node between the networks, so that the exchange of secret information is secured between different networks.

By using the apparatus according to the present invention, for the conversion of crypt algorithm, information exchange can be made possible between systems which adopt different crypt algorithms.

DETAILED DESCRIPTION OF THE INVENTION

The present invention is a copyright management system and an apparatus for digital content. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The description of the preferred embodiments according to the present invention is given below referring to the accompanied drawings.

Figure 1:
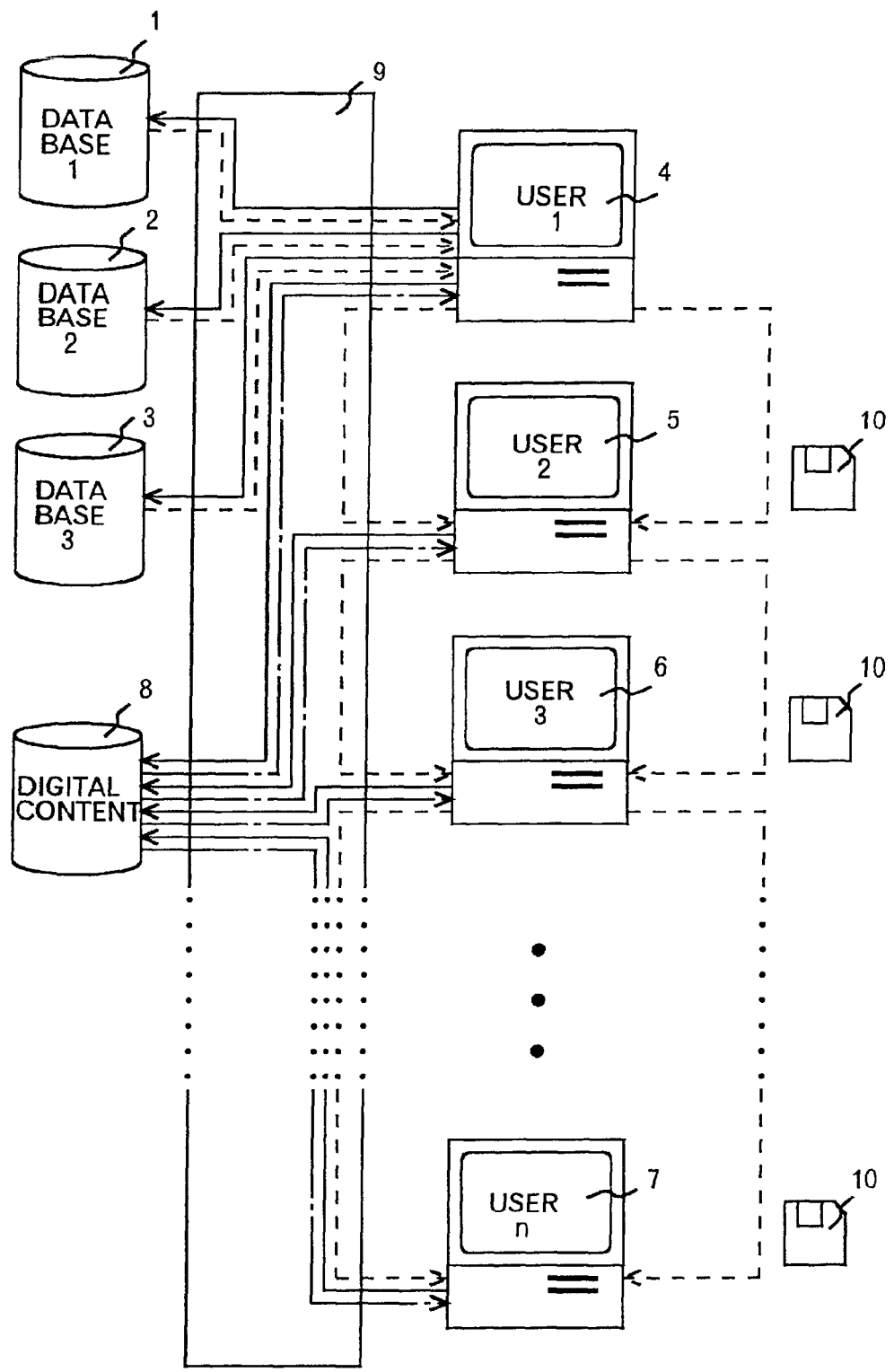
FIG. 1 is a structural view of a digital content management system to which the present application is applied.

FIG. 1 shows a structure of the digital content management system to which the present application applies.

In this digital content management system illustrated in FIG. 1, reference numerals 1, 2 and 3 represent databases stored text data, binary data of a computer graphics screen or a computer program and digital content of sound or picture data, which are not encrypted. 9 represents a communication network constituted of using a public telephone line offered by a communication enterprise or a CATV line offered by a cable television enterprise, 4 represents a primary user terminal, 5 represents a secondary user terminal, 6 represents a tertiary user terminal, and 7 represents an n-order user terminal, and 8 represents a digital content management center.

On the above arrangement, the databases 1, 2, 3, the digital content management center 8, primary user terminal 4, secondary user terminal 5, tertiary user terminal 6, and n-order user terminal 7 are connected to the communication network 9.

In this Figure, a path shown by a broken line represents a path for transferring encrypted digital content, a path shown by a solid line represents a path for transferring requests from each of the user terminals 4, 5, 6, 7 to the digital content management center 8, a path shown by a one-dot chain line represents a path through which a permit key corresponding to a usage request, a digital content management program and a crypt key are transferred from each of the databases 1, 2, 3, and the digital content management center 8 to each of the user terminals 4, 5, 6, 7.

This digital content management system employs a first public-key Kb1, a first private-key Kv1 corresponding to the first public-key Kb1, a second public-key Kb2, and a second private-key Kv2 corresponding to the second public-key Kb2 that are prepared by the user, and a first secret-key Ks1 and a second secret-key Ks2 prepared by the database. The database encrypts digital content M by using the first secret-key Ks1:

$$Cmks1=E(Ks1,M),$$

and further encrypts the first secret-key Ks1 by the first public-key Kb1:

$$Cks1kb1=E(Kb1,Ks1),$$

and the second secret-key Ks2 by the second public-key Kb2:

$$Cks2kb2=E(Kb2,Ks2).$$

The database then transfers these encrypted digital content Cmks1, the first and second secret-keys Cks1$kb$1 and Ck2$kb$2 to the user.

The user decrypts the encrypted first secret-key Cks1$kb$1 using the first private-key Kv1:

$$Ks1=D(Kv1,Cks1kb1),$$

and decrypts the encrypted digital content Cmks1 by the decrypted first secret-key Ks1:

$$M=D(Ks1,Cmks1)$$

and uses it. The user decrypts encrypted second secret-key Cks2$kb$2 by the second private-key Kv2:

$$Ks2=De(Kv2,Cks2kb2),$$

which is subsequently used as a crypt key for storing, copying, or transferring digital content.

If the primary user 4 copies digital content obtained and then supplies it to the secondary user 5, the digital content does not involve the copyright of the primary user 4 because no modifications have been made to the digital content. If, however, the primary user 4 produces new digital content based on the digital content obtained or using a means for combining with other digital content, the new digital content involves a secondary copyright for the primary user 4, and the primary user 4 has the original copyright for this secondary work.

Similarly, if the secondary user 5 produces further new digital content based on the digital content obtained from the primary user 4 or combining with other digital content, the new digital content involves a secondary copyright for the secondary user 5, and the secondary user 5 has the original copyright of this secondary work.

Databases 1, 2, and 3 store text data, binary data constituting computer graphics screens or programs and digital content such as digital audio data and digital picture data, which are encrypted and supplied to the primary user terminal 4 via network 9 during a digital content read operation in response to a request from the primary user terminal 4.

Managing the digital content obtaining from the database is carried out by the method described in Japanese Patent Laid-open No. 185448/1996 or in Japanese Patent Laid-Open No. 287014/1996, which have been proposed by the present inventor.

Recently, a PCI (Peripheral Component Interconnect) bus has attracted attention as means for implementing a multiprocessor configuration in a typical personal computer. The PCI bus is a bus for external connection connected to a system bus of a personal computer via a PCI bridge, and allows to implement a multiprocessor configuration.

The digital content includes graphics data, computer programs, digital audio data, still picture data by JPEG and also moving picture data by MPEG 1 or MPEG 2, in addition to character data. In case that the digital content to be managed is moving picture data by JPEG still picture system or moving picture data by MPEG 1 or MPEG 2, as having remarkably large amount of data with high speed, managing the digital content by a single processor is difficult.

Figure 2:
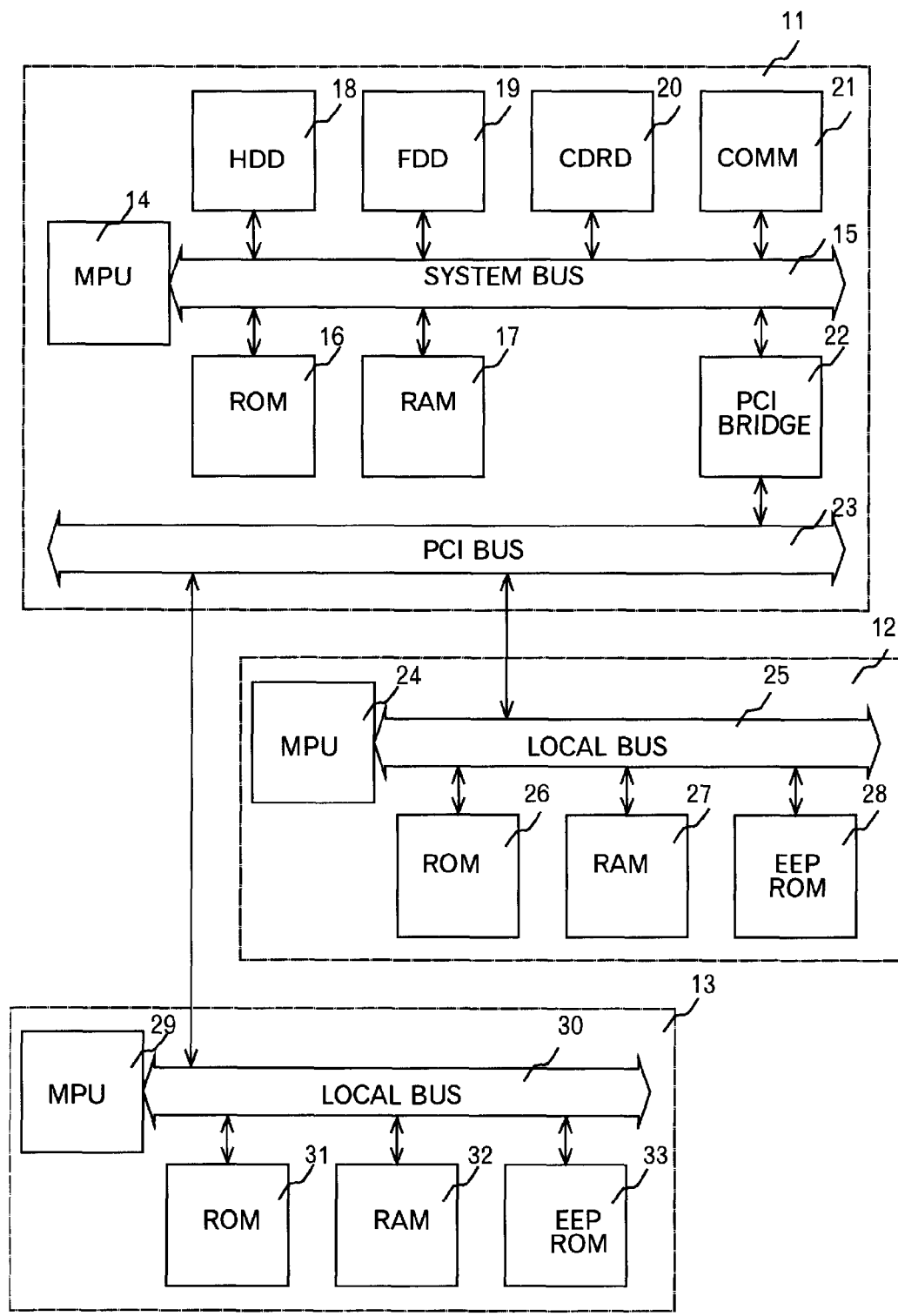
FIG. 2 is a structural view of a digital content management apparatus to which the present application is applied.

FIG. 2 is a block diagram illustrating an arrangement of a digital content management apparatus used for managing the digital content of the above in the digital content management system shown in FIG. 1.

The digital content management apparatus comprises a first digital content management apparatus 12 connected to a user terminal 11 and a second digital content management apparatus 13.

The first digital content management apparatus 12 has a computer configuration having a MPU (MicroProcessor Unit) 24, a local bus 25 of MPU 24, ROM (Read-Only Memory) 26 connected to the local bus 25, RAM 27 and EEPROM (Electrically Erasable Programmable Read-Only Memory) 31.

A PCI bus 23 is connected to a system bus 15 for a microprocessor 14 via a PCI bridge 22 and the local bus 25 for the MPU 24 of the digital content management apparatus 12 is connected to the PCI bus 23, and also a local bus 30 for MPU 29 of the digital content management apparatus 13. Also connected to the system bus 15 of the user terminal 11 are a communications device (COMM) 21 which receives digital content from external databases and transfers digital content to the external of the terminal, a CD-ROM drive (CDRD) 20 which reads digital content supplied on CD-ROM, a flexible disk drive (FDD) 19 which copies received or edited digital content in a flexible disk to supply to the external of terminal, and hard disk drive (HDD) 18 used for storing digital content. COMM 21, CDRD 20, FDD 19, and HDD 18 may also be connected to the PCI bus 23. While ROM, RAM etc., of course, are connected to the system bus 15 of the user terminal, these are not shown in FIG. 2.

The decryption and re-encryption operations are performed by either of the MPU 24 of the first digital content management apparatus 12 and the MPU 29 of the second digital content management apparatus 13, i.e., one performs decryption and the other performs re-encryption at the same time. Since the configuration of the MPU 24 and MPU 29 in FIG. 2 is a multiprosessor configuration which performs parallel processing with a PCI bus 23, high processing speed can be achieved.

In the digital content management apparatus shown in FIG. 2, the storage medium, such as HDD 18, for storing re-encrypted digital content is connected to the system bus 15 of the user terminal 11. In order to store re-encrypted digital content, therefore, the encrypted digital content must be transferred by way of the system bus 15 of the user terminal 11 and the local bus 25 or 30 of the digital content management apparatus 12 or 13, and consequently, processing speed can be slowed.

Figure 3:
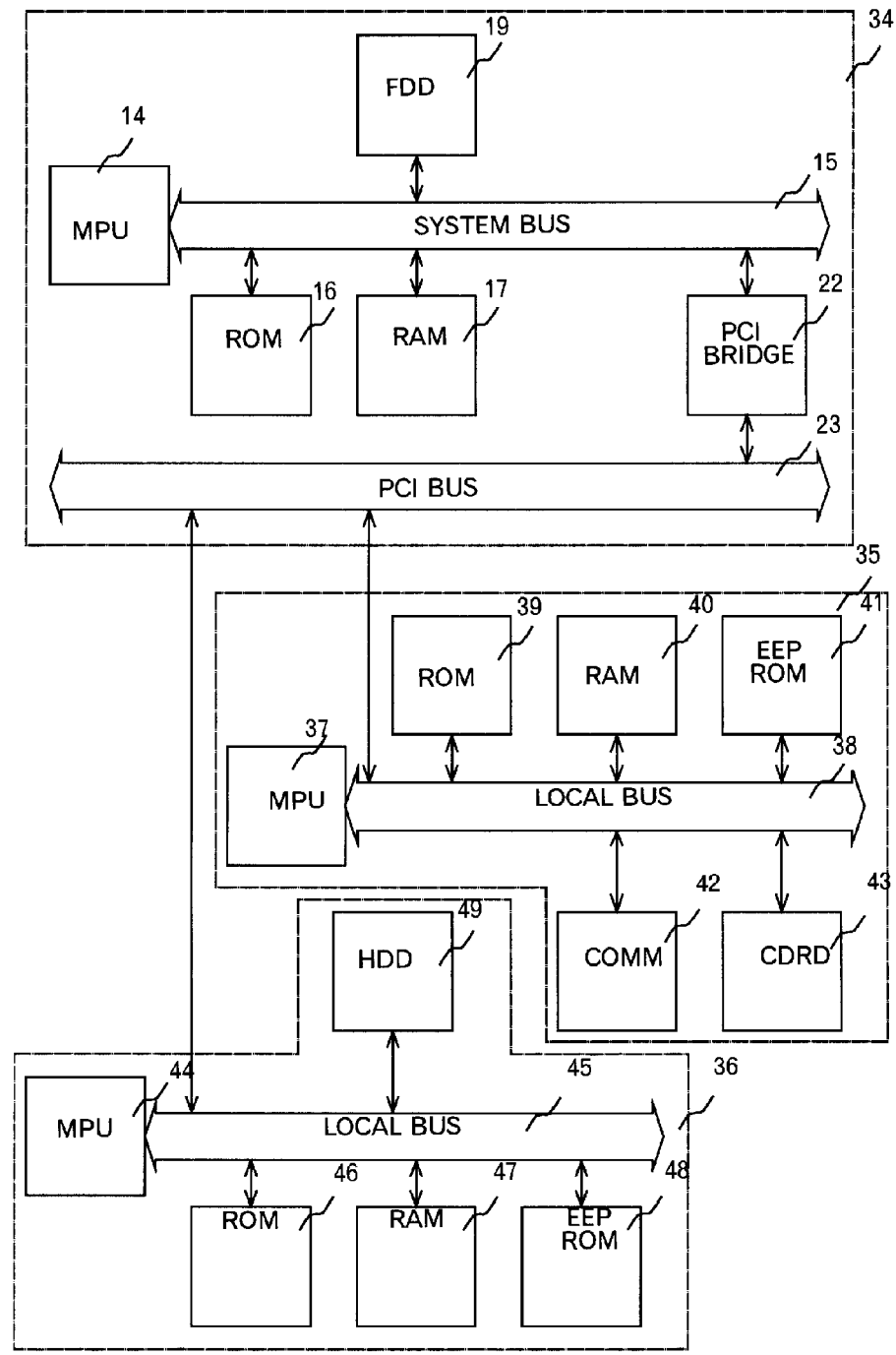
FIG. 3 is a structural view of another digital content management apparatus to which the present application is applied.

In the digital content management apparatus shown in FIG. 3, a communications device COMM and a CD-ROM drive CDRD are connected to a local bus of a digital content management apparatus for decryption, and a storage device such as HDD for storing re-encrypted digital content are connected to the local bus of a digital content management apparatus for re-encryption.

The digital content management apparatus 35 for decryption has the computer system configuration having a MPU 37, a local bus 38 for the MPU 37, and ROM 39, RAM 40 and EEPROM 41 connected to the local bus 38, and a communication device COM 42 and a CD-ROM drive CDRD 43 are connected to the local bus 38. The encrypted digital content supplied from the communication device COM 42 and the CD-ROM drive CDRD 43 are decrypted in this apparatus.

The digital content management apparatus 36 for re-encryption has the computer system configuration having a MPU 44, a local bus 45 for the MPU 44, and ROM 46, RAM 47 and EEPROM 48 connected to the local bus 45, and HDD 49 is connected to the local bus 45. The digital content which has been re-encrypted in the digital content management apparatus 36 for re-encryption is stored in HDD 49.

In the protection of a digital content copyright, the greatest issue is how to prevent from illegitimate usage of the digital content on the user side apparatus. Decryption/re-encryption and restriction on usage are carried out by a digital content management program for this purpose.

However, since decryption/re-encryption of the digital content to be protected the copyright is performed using an apparatus on the user side, it is virtually impossible to expect that processing of the decryption/re-encryption and the management of the crypt key which is used for the purpose will be complete. There is a possibility that the digital content will be illegitimately stored, copied, transmitted and edited by invalidating the digital content management program.

In order to restrict such illegitimate usage, it is required that a digital content management program for decryption/re-encryption of the digital content, and for managing the crypt key cannot be altered by the user. For this purpose, incorporation of the digital content management program into the hardware is the most secure method.

For example, there is a configuration in which a dedicated scramble decoder is currently used for descrambling scrambled broadcast programs in analog television broadcast, so that decryption/re-encryption of the digital content and management of the crypt key are available only by using a dedicated digital content management apparatus.

Although such a configuration is reliable, the system structure is lacking in flexibility. When the apparatus on the user side is changed, or the digital content management program is changed, it is very hard for the user to respond to such changes. In case of a network computer on which has been recently focused, since the network computer does not have a function for storing the digital content management program, it would be impossible to realize the digital content management program in the hardware.

In order to correspond with flexibility to a case where the apparatus on the user side changes, or a case where the digital content management program is changed, it is desirable for the digital content management program to be software. However, there is a possibility that the digital content management program is altered as long as the digital content management program is an application program.

For the digital content management program being software, the digital content management program is required to be incorporated in a kernel that is a fixed area and cannot be altered by the user. However, it is not practical for the digital content management program to be incorporated in the fixed area of a kernel, where the digital content management system and the cryptosystem are differentiated between the databases.

As described above, some real time OS can perform interruption in real time slice time which is one or two Figures faster than the time slice of the system in another OS that includes kernel area. By using this technology, the usage status of the digital content which is claiming the copyright, is watched without affecting the overall operation. And if an illegitimate usage is found, it is possible to give a warning or to forcibly stop the usage thereof.

Next, a method for reinforcing a digital content management program by using a real time OS is described.

The digital content management apparatus shown in FIG. 2 has a multi-processor structure in which a first digital content management apparatus 12 and a second digital content management apparatus 13 are connected to an apparatus on the user side via a PCI bus. The decryption and re-encryption operations of the first digital content management apparatus 12 and the second digital content management apparatus 13 are controlled by the digital content management program in the user terminal 11.

The digital content management program of the user terminal 11 also manages the operation of the communication device 21, the CD-ROM drive 20, the flexible disk drive 19 and the hard disk drive 18, which manage loading or downloading of encrypted digital content, and storing into the hard disk drive 18, copying to the flexible disk drive 19 and uploading to the communication device 21 of re-encrypted digital content.

Since illegitimate usage of the digital content is carried out by unauthorized editing, unauthorized storing, unauthorized copying or unauthorized uploading of the decrypted digital content, whether the illegitimate usage has been carried out or not, can be detected by whether editing, storing, copying or uploading of the decrypted digital content is performed or not. As a consequence, the process for watching the illegitimate usage interrupts a digital content use process which is being executed in a certain time interval, while interrupting by a preemptive type multi-task which forcibly carries out watching of the process.

The multi-task time slice normally carried out is 10 milliseconds, and the decryption/re-encryption process is carried out in this time unit. On the other hand, the fastest real time slice is 100 microseconds, which is $\{fraction\ (1/100)\}$ of the normal time unit. Consequently, the watching task, which has high interruption priority, can watch the digital content as to whether the decrypted digital content is being edited, stored, copied or uploaded, so that the usage status of the digital content for which the copyright is claimed can be watched without affecting regular usage by the user, and a warning can be given and usage thereof can be forcibly stopped.

The digital content management program with such a watching function is incorporated into a sub-system area which is operated in the user mode in place of the kernel of the OS, and the watch process is regarded as a process with a high priority. By constituting the system in this way, the usage status of the digital content by decryption/re-encryption and also the illegitimate usage other than the permitted usage can be watched at the same time, and such watching can be executed smoothly.

The digital content management apparatus shown in FIG. 3 has a multi-processor structure in which a first digital content management apparatus 35 and a second digital content management apparatus 36 are connected to an apparatus on the user side via a PC1 bus. The decryption and re-encryption operations of the first digital content management apparatus 35 and the second digital content management apparatus 36 are controlled by the digital content management program in the user terminal 34.

The digital content management program of the user terminal 34 also manages the operation of the communication device 42, the CD-ROM drive 43, the flexible disk drive 19 and the hard disk drive 39, which manage loading or downloading of encrypted digital content, and storing into the hard disk drive 39, copying to the flexible disk drive 19 and uploading to the communication device 42 of re-encrypted digital content.

Since illegitimate usage of the digital content is carried out by unauthorized editing, unauthorizing storing, unauthorized copying or unauthorized uploading of the decrypted digital content, it can be detected as to whether the illegitimate usage has been carried out or not, by checking whether editing, storing, copying or uploading of the decrypted digital content is performed or not. As a consequence, the process for watching the illegitimate usage interrupts a digital content use process which is being executed in a certain time interval, while interrupting by a preemptive type multi-task which forcibly carries out watching of the process.

The multi-task time slice normally carried out is 10 milliseconds, and the decryption/re-encryption process is carried out in this time unit. On the other hand, the fastest real time slice is 100 µs, which is $1/100$ of the normal time unit. Consequently, the watching task, which has high interruption priority, can watch the digital content as to whether the decrypted digital content is being edited, stored, copied or uploads, so that the usage status of the digital content for which the copyright is claimed can be watched without affecting regular usage by the user, and if illegitimate usage is found, a warning can be given and usage thereof can be forcibly stopped.

The digital content management program with such a watching function is incorporated into a sub-system area which is operated in the user mode in place of the kernel of the OS, and the watching process is regarded as a process with a high priority. By constituting the system in this way, the usage status of the digital content by decryption/re-encryption and also the illegitimate usage other than the permitted usage can be watched at the same time, and such watching can be executed smoothly.

Figure 4:
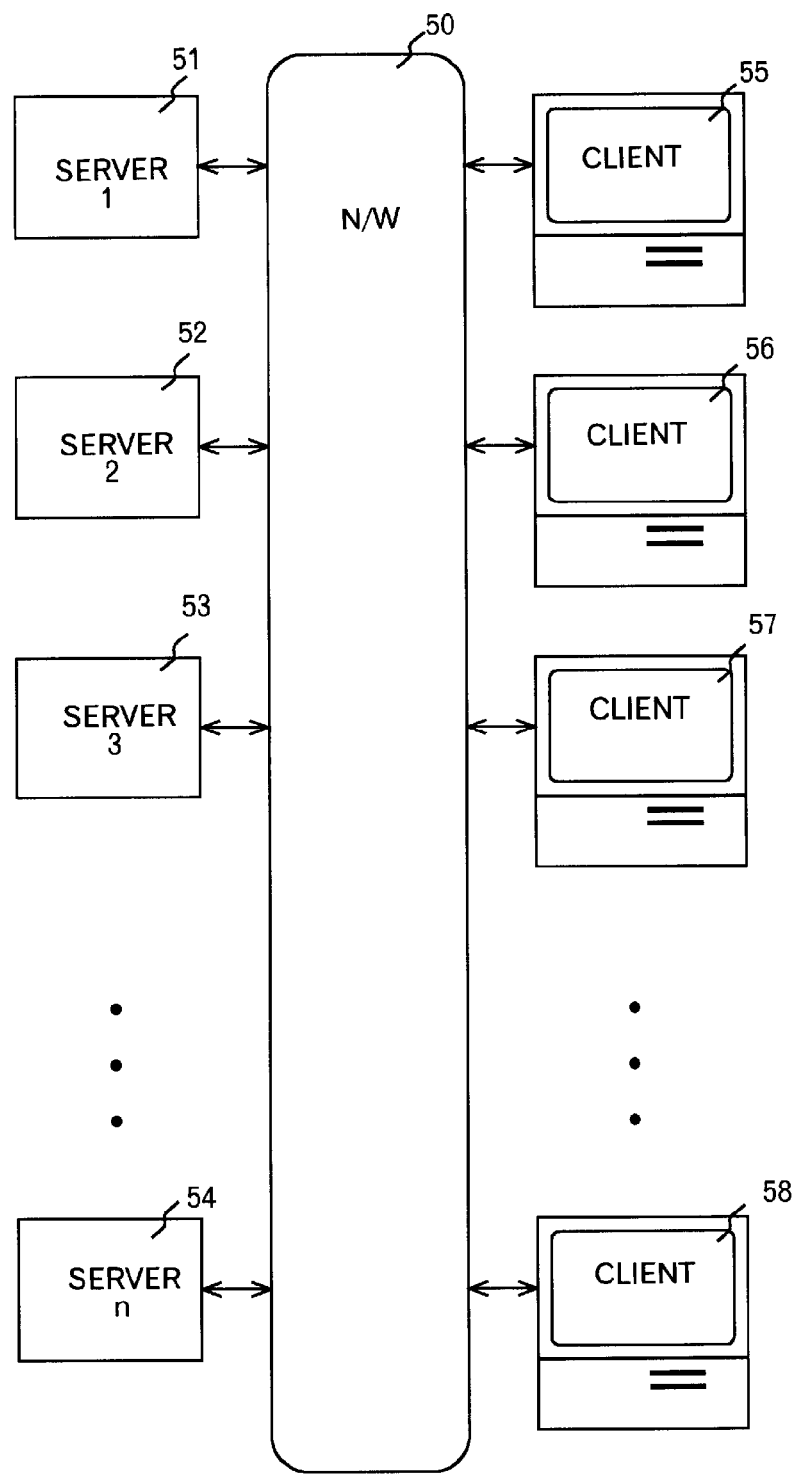
FIG. 4 is a structural view of a system for watching the digital content usage according to the present invention.

Next, a structure for watching the illegitimate usage of the digital content in the distributed OS is described referring to FIG. 4. FIG. 4 illustrates a structure of a general distributed type OS, in which servers 51 to 54 and clients 55 to 58 are connected to a network 50.

The network 50 is a restricted network such as LAN (Local Area Network) in an office. Each of the servers 51 to 54 stores basic OS elements of the micro-kernel, application elements which are a sub-system, or the digital content. In order to manage the digital content, the digital content management program which has been described so far is required. This digital content management program is stored, for example, in the server 54. And the watch program for watching the illegitimate usage of the digital content having a high priority for interruption is stored, for example, in the supervisory server 51 for supervising the overall operation of the distributed Os.

Although the terminal apparatus of the clients 55 to 58 is a simple terminal, the terminal is provided with a copying device such as a flexible drive or the like when necessary.

In such a structure, when the clients 55 to 58 use the digital content which is stored in the servers 51 to 54, the clients 55 to 58 are supplied the micro-kernel that is the basic OS elements from each of the servers, and also supplied the digital content management program which is stored in the server 54, and thus, the digital content can be used.

The digital contents stored in the server are either encrypted or not encrypted. In either of these cases, the digital content is supplied with encrypted when supplied to the clients. Therefore, in order for the client to use the encrypted digital content, it is necessary to obtain the crypt key and to decrypt by the digital content management program as has been described above.

The fact that the client uses the digital content and the digital content management program is grasped by the supervisory server 51. This watch process automatically interrupts the process which is being executed by the client at regular intervals without the client's request, and watches, and gives a warning or stop of the usage if an illegitimate usage is detected.

Since such a watch process can be completed with a process having a small size, and therefore, that affects little on the operation on the client side, and the user does not notice the operation of the watch program.

In the distributed OS, the servers and the clients have been explained as separated. However, the aforementioned structure may be applied when a client machine is provided with a hard disk drive, and the client machine also serves as the server machine. When the network 50 is not a restricted one as LAN in a office, but a non-restricted one such as the Internet system, the aforementioned structure can be also applied.

In particular, such a structure is effective in a network computer system. Even in the case where the user modifies a computer not provided with a storage device, a copying device or a communication device for transmission, or use a normal computer pretending to be of a network computer system, the digital content can be managed by remote control.

Furthermore, the structure can be applied to the digital content management system shown in FIG. 1. In such a case, the watch program is stored in the digital content management center 8 of FIG. 1 to regularly watch whether users illegitimately use the encrypted digital content supplied from the database through the network 9 by remote control.

In case where the digital content is broadcast via analog data broadcast or via digital data broadcast, the watch program may be transferred by inserting to the digital content. Also, the watch program may be resident in an apparatus of the digital content user so that the remote control is made possible by periodically broadcasting watch program control signal.

In the case where the digital content having a large amount of information, such as digital picture content is handled in the digital content management system which is carried out via the network, an ISDN (Integrated System for Digital Network) line is used in many cases as a communication line.

As the ISDN line, there are generally used two data channels having a data transmission speed of 64 Kbps (Kilo bits per second) referred to as B channels, and a control channel having a data transmission speed of 16 Kbps referred to as D channel. Naturally, the digital content is transmitted through one or two data channels, while the D channel is not used in many cases.

Thus, if the D channel is used for the interruption watching by the watch program, it would be possible to watch the usage status by remote control without affecting the usage of the digital content at all.

When the user uses information to which a copyright is claimed, the real time OS is automatically linked to the digital content management center, it is also possible to watch and manage the re-encryption mechanism with a real time OS as a result.

Further, in the case where a digital content creator or an end user uses information to which a copyright is claimed, a re-encryption program resident in the PC uses the real time OS so that remote watching and management can be made possible.

Figure 5:
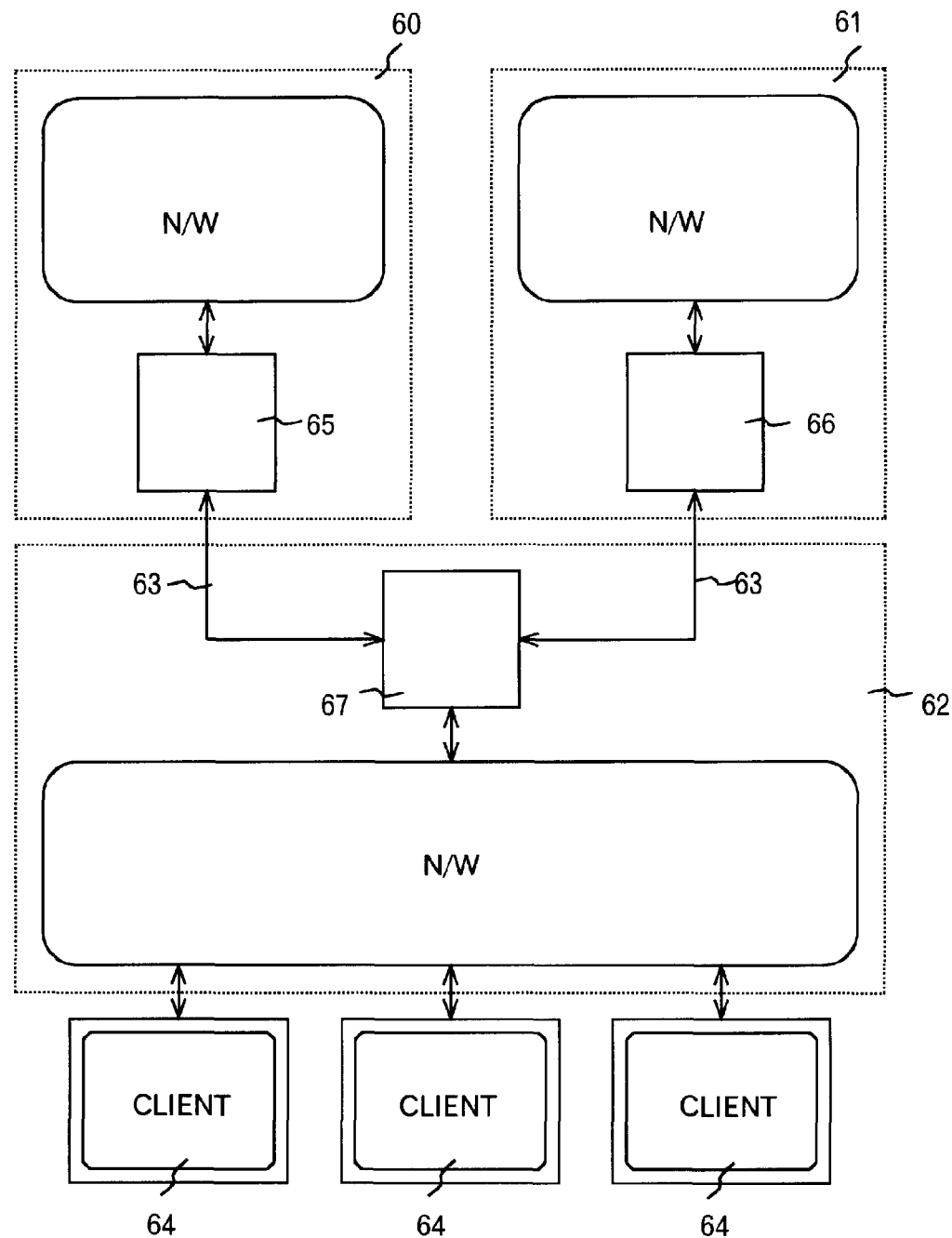
FIG. 5 is a structural view of a system for protecting digital content secrecy according to the present invention.

Next, application of the digital content management system to the prevention of the leakage of information is described. FIG. 5 illustrates a structure of the system for preventing from the leakage of information by applying the system to an intranet system in which a LAN is connected to the Internet system.

In FIG. 5, reference numerals 60, 61, and 62 represent the network systems which are connected to each other by a public line 63. In particular, the network system 62 is a LAN system established in a office or the like. These network systems are connected with each other via a public communication line or the like to constitute an Internet system as a whole. Clients 64, 64, 64 are connected to the LAN system 62 and servers not shown in the Figure are connected in addition.

The LAN system has secret data such as business secrets and the like therein. Since the LAN system is connected to the outside network, the problems of the leakage of the secret information to the outside, or of the access to the secret information from the outside may arise. As a consequence, although an information partition, called a "fire-wall," is normally provided between the LAN system and the public line, that is not technologically perfect. Also, even in the case of the business secret data, it may be necessary to supply the business secret data to another party, where the another party network has a common interest, and in such a case, the presence of the fire-wall becomes an obstacle.

As has been described repeatedly, the management of the secret data can be completely carried out through encryption. In the case where the crypt algorithm used in the other party network is common with the algorithm used in the one's own network, the secret data can be shared by sending the crypt key to the other party by some means. In the case where the crypt algorithm used in the other party network is different from the algorithm which is used in one's own network, such means cannot be adopted.

In order to cope with such a problem, crypt key conversion devices 65, 66 and 67 are arranged in place of or together with the fire-wall in the Internet system shown in FIG. 5. These crypt key conversion devices 65, 66 and 67 have the same configuration as the digital content management apparatus which have been described by using FIGS. 2 and 3, and perform decryption/re-encryption by two different crypt keys.

For example, the crypt key conversion device 65 decrypts an encrypted data from the network 60, and re-encrypts the decrypted data by using the crypt key common to the whole Internet system. The crypt key conversion device 67 which has received the re-encrypted data decrypts the re-encrypted data by using the crypt key common to the whole Internet system, and re-encrypts the decrypted data and supplies it to the client 64. By doing this, the problem of sending the crypt key is alleviated.

These crypt key conversion devices 65, 66 and 67 can be arranged in a gateway or a node which is used as a connection between networks. Further, even in a closed network system other than the Internet, which is a liberated system, this system functions efficiently in such cases where individual information such as reliability information, medical information or the like is handled, and where access to the data is necessary to differ by levels.

These crypt key conversion devices also can be used so as to convert the crypt algorithm. There are plurality of crypt algorithms which are currently used or proposed. In the worst case, a plurality of networks using different crypt algorithm respectively coexist, and thus, compatibility is lost, which becomes an obstacle to the development of the information oriented society. Even if a new effective crypt algorithm is developed, and if it has not compatibility with the existing crypt algorithm, an obstacle to the development of the information oriented society may similarly be brought.

In order to cope with such problems, the crypt algorithm can be converted by arranging the crypt key conversion devices 65, 66 and 67 of FIG. 5 in the gateway on the network. These crypt algorithm conversion devices decrypt the encrypted data to be re-encrypted with a different crypt algorithm.

For example, the crypt algorithm conversion device 65 decrypts the data which is encrypted by a crypt algorithm unique to the network 60 and re-encrypts the decrypted data by a crypt algorithm which is common in the whole Internet system. The crypt algorithm conversion device 67 that has received the re-encrypted data decrypts the re-encrypted data, encrypts the decrypted data by the crypt algorithm unique to the network 62, and supplies it to the client 64.

By doing so, it becomes possible to handle the encrypted data between networks that adopt different crypt algorithms. Here, there may be two cases; one is a case in which the crypt key is not changed at all, and the other is a case in which the crypt key is changed at each stage.

In using databases, in a case where a data storing server referred to as "proxy server" or "cache server" is used, and where the digital content is encrypted, the crypt key or crypt algorithm used between a data server and the proxy server may be differentiated from the crypt key or crypt algorithm used between the proxy server and a user, and then, the conversion of them is carried out by using the crypt key conversion device or crypt algorithm conversion device, so that the encrypted digital content can be prevented from illegitimate usage thereof.

The conversion of the crypt algorithm by these devices can be effected by units of countries. Even in the case where crypt algorithms are used which differ from one country to another, it becomes possible to adopt a key escrow system unique to the respective country, or a key recovery system using the key escrow system.

It is understood that particular embodiments described herein are illustrative and the present invention is not limited to these particular embodiments. It will be apparent to those skilled in the art that changes can be made in the various details described herein without departing from the scope of the invention. The present invention is defined by the claims and their full scope of equivalents.

I claim:

1. A method, comprising:
in response to a forcible interruption of a content use process, a computing system monitoring usage of digital content by the content use process, wherein the forcible interruption is based on an interrupt priority associated with said monitoring; and
in response to determining that the monitored usage of the digital content by the content use process is inconsistent with usage rights associated with the digital content, the computing system prohibiting further usage of the digital content by the content use process;
wherein the computing system includes a hardware processor.

2. The method of claim 1, wherein said monitoring is performed using a monitoring process, and wherein the interrupt priority associated with said monitoring is an interrupt priority assigned to the monitoring process.

3. The method of claim 2, wherein the interrupt priority assigned to the monitoring process is assigned by an operating system.

4. The method of claim 3, wherein the operating system is a distributed operating system.

5. The method of claim 4, further comprising the computing system supplying the monitoring process over a network to a client device on which the content use process is executed, wherein the forcible interruption of the content use process occurs without the client device requesting the forcible interruption.

6. The method of claim 2, wherein said prohibiting further usage is performed in response to determining that the monitored usage of the digital content includes unauthorized transferring of the digital content by the content use process, and wherein the interrupt priority assigned to the monitoring process is higher than an interrupt priority assigned to the content use process.

7. The method of claim 1, wherein said prohibiting further usage of the digital content by the content use process includes prohibiting further usage at a client device.

8. An apparatus, comprising:
a processor; and
memory having instructions stored thereon that are executable by the apparatus to cause the apparatus to:
in response to an interruption of a content use process by an operating system, monitor usage of digital content by the content use process; and
in response to determining that the monitored usage of the digital content is inconsistent with usage rights associated with the digital content, prohibit further usage of the digital content by the content use process.

9. The apparatus of claim 8, wherein the instructions are executable to cause the apparatus to execute the operating system as a preemptive multitasking operating system.

10. The apparatus of claim 8, wherein the instructions are executable as a subsystem of the operating system to cause the apparatus to monitor the usage of the digital content by the content use process.

11. The apparatus of claim 8, wherein the instructions are executable as a monitoring process to cause the apparatus to interrupt the content use process based on the monitoring process having an interrupt priority that is higher than an interrupt priority of the content use process.

12. The apparatus of claim 8, wherein the instructions are executable to cause the apparatus to monitor the usage of the digital content on a computing system that is coupled to the apparatus via a network.

13. The apparatus of claim 8, wherein the operating system is a distributed operating system, wherein the apparatus is configured to send the instructions executable to monitor usage of the digital content over a network to a computing device, and wherein the sent instructions are executable to cause the computing device to monitor usage of the digital content at the computing device.

14. The apparatus of claim 8, wherein the operating system is a distributed operating system, and wherein the apparatus is configured to receive the instructions executable to monitor usage of the digital content from a server.

15. The apparatus of claim 8, wherein the instructions are executable to cause the apparatus to prohibit the further usage of the digital content in response to determining that monitored editing, copying, storing, or transferring of the digital content is inconsistent with the usage rights associated with the digital content.

16. An article of manufacture including a non-transitory computer readable medium having instructions stored thereon that are executable by a computing system to cause the computing system to execute a watch process that monitors usage of digital content by a forcibly interrupted content use process, wherein the watch process has a higher interrupt priority than an interrupt priority of the content use process.

17. The article of manufacture of claim 16, wherein the instructions are executable to further cause the computing system to prohibit further usage of the digital content by the content use process in response to determining, using the watch process, that the monitored usage of the digital content by the content use process is inconsistent with usage rights associated with the digital content.

18. The article of manufacture of claim 17, wherein the instructions are executable to further cause the computing system to generate, in response to the determining, a warning that the monitored usage is prohibited.

19. The article of manufacture of claim 16, wherein instructions are executable to cause the computing system to monitor usage of decrypted digital copyright data.

20. The article of manufacture of claim 16, wherein instructions are executable to cause the computing system to monitor the usage without affecting the manner in which the content use process accesses the digital content.

* * * * *

UNITED STATES PATENT AND TRADEMARK OFFICE
CERTIFICATE OF CORRECTION

PATENT NO. : 8,448,254 B2
APPLICATION NO. : 12/917184
DATED : May 21, 2013
INVENTOR(S) : Saito It is certified that error appears in the above-identified patent and that said Letters Patent is hereby corrected as shown below:

In the Specification

In Column 1, Line 8, delete "now" and insert -- (now --, therefor.

In Column 2, Line 39, delete "as" and insert -- has --, therefor.

In Column 5, Line 6, delete "therefor" and insert -- therefore --, therefor.

In Column 7, Line 60, delete "multiprosessor" and insert -- multiprocessor --, therefor.

In Column 10, Line 5, delete "PC1" and insert -- PCI --, therefor.

In Column 10, Line 14, delete "hard disk drive 39," and insert -- hard disk drive 49, --, therefor.

In Column 10, Lines 15-16, delete "hard disk drive 39," and insert -- hard disk drive 49, --, therefor.

In Column 11, Line 34, delete "a office," and insert -- an office, --, therefor.

In Column 12, Line 25, delete "a office" and insert -- an office --, therefor.

Signed and Sealed this
Twenty-fifth Day of March, 2014

Michelle K. Lee
*Deputy Director of the United States Patent and Trademark Office*